United States Patent [19]
Gary et al.

[11] Patent Number: 6,083,301
[45] Date of Patent: Jul. 4, 2000

[54] PROCESS FOR PURIFYING INERT FLUIDS BY ADSORPTION ON LSX ZEOLITE

[75] Inventors: Daniel Gary, Montigny le Bretonneux; René Lardeau, Saulx les Chartreux, both of France

[73] Assignee: L'Air Liquide, Societe Anonyme pour l'Etude et l'Exploitation des Procedes Georges Claude, Paris Cedex, France

[21] Appl. No.: 09/204,221

[22] Filed: Dec. 3, 1998

[30] Foreign Application Priority Data

Dec. 5, 1997 [FR] France ................................ 97 15410

[51] Int. Cl.⁷ .................................................. B01D 53/04
[52] U.S. Cl. ............................... 95/130; 95/138; 95/139; 95/140; 95/143; 95/148
[58] Field of Search ..................... 95/96–98, 100–105, 95/130, 138–140, 143, 148

[56] References Cited

U.S. PATENT DOCUMENTS

| | | | |
|---|---|---|---|
| 2,810,454 | 10/1957 | Jones et al. | 95/138 |
| 2,893,512 | 7/1959 | Armond | 95/130 X |
| 3,535,074 | 10/1970 | Nakashima | 95/138 X |
| 3,928,004 | 12/1975 | Bligh et al. | 95/138 X |
| 3,996,028 | 12/1976 | Golovko et al. | 55/58 |
| 4,054,428 | 10/1977 | Foltz | 96/130 X |
| 4,239,509 | 12/1980 | Bligh et al. | 95/130 |
| 4,816,237 | 3/1989 | Tomomura et al. | 95/130 X |
| 5,100,447 | 3/1992 | Krishnamurthy et al. | 95/130 X |
| 5,106,399 | 4/1992 | Fisher | 95/130 X |
| 5,125,934 | 6/1992 | Krishnamurthy et al. | 95/130 X |
| 5,152,813 | 10/1992 | Coe et al. | 95/130 X |
| 5,268,023 | 12/1993 | Kirner | 95/103 |
| 5,413,625 | 5/1995 | Chao et al. | 95/130 X |
| 5,464,467 | 11/1995 | Fitch et al. | 95/130 X |
| 5,601,634 | 2/1997 | Jain et al. | 95/130 X |
| 5,784,898 | 7/1998 | Gary | 95/138 X |
| 5,868,818 | 2/1999 | Ogawa et al. | 95/130 X |
| 5,885,331 | 3/1999 | Reiss et al. | 95/130 X |
| 5,912,422 | 6/1999 | Bomard et al. | 95/130 X |

FOREIGN PATENT DOCUMENTS

| | | |
|---|---|---|
| 0 646 543 | 4/1995 | European Pat. Off. . |
| 0 662 595 | 7/1995 | European Pat. Off. . |
| 0 667 183 | 8/1995 | European Pat. Off. . |

OTHER PUBLICATIONS

M. J. Andrecovich, "Purification Argon Gas Stream Contain Nitrogen Oxygen Impure Temperature Swing Adsorb Nitrogen Oxygen Select Sorption", AU 47537 93, BOC Group Inc, Apr. 14, 1994.

*Primary Examiner*—Robert Spitzer
*Attorney, Agent, or Firm*—Young & Thompson

[57] ABSTRACT

Process for purifying an inert fluid, in particular argon or helium, with respect to at least one of its impurities nitrogen ($N_2$), oxygen ($O_2$), carbon dioxide ($CO_2$), carbon monoxide (CO) and hydrocarbons, in which at least some of the impurities are removed using a first adsorbent of the X zeolite type having a silica to aluminum ratio less than or equal to 1.15, and a purified inert fluid containing at most 10 ppb, preferably at most 1 ppb of impurities is recovered.

18 Claims, 3 Drawing Sheets

6,083,301

PROCESS FOR PURIFYING INERT FLUIDS BY ADSORPTION ON LSX ZEOLITE

FIELD OF THE INVENTION

The present invention relates to a process for purifying inert fluids, in particular argon or helium.

BACKGROUND OF THE INVENTION

Inert fluids, such as argon, krypton, xenon and helium are being used more and more in the electronics industry.

For this reason, there is an increasing demand for ultra-pure inert fluids, in particular argon and helium, that is to say ones which are substantially free of the impurities which they contain, such as impurities of the following types: oxygen ($O_2$), carbon monoxide (CO), nitrogen ($N_2$), carbon dioxide ($CO_2$), hydrogen ($H_2$) and hydrocarbons (methane, etc.).

There are many documents dealing with the purification of inert fluids, in particular the purification of liquid argon or argon gas with respect to its impurities nitrogen and oxygen, which impurities may be found in argon at concentrations which can vary depending on the way in which they are produced, to be precise, up to 1000 ppb for oxygen and from 500 to 2000 ppb for nitrogen.

The following documents may, in particular, be cited: JP-A-5818777, JP-A-59223203, JP-A-7138007, JP-A-3164410, JP-A-5461091, AU-A-659759, U.S. Pat. No. 5,204,075, EP-A-606848, U.S. Pat. No. 5,419,891, U.S. Pat. No. 5,159,816, EP-A-514163, U.S. Pat. No. 4,983,199 and U.S. Pat. No. 3,928,004.

According to these documents, the impurities $N_2$ and $O_2$ contained in argon are generally removed by adsorption on a zeolite of the following types: X, A, mordenite or chabazite, optionally exchanged by cations such as the cations Li, K, Ca, Sr, Ba, Mg, etc.

However, these various processes for purifying inert fluids, in particular argon, cannot be regarded as fully satisfactory given that, in general, they are not suitable for obtaining ultrapure fluids that can be used directly in the field of electronics.

This is because the specifications governing the electronics industry require inert fluids substantially free of all their major impurities, such as the impurities $N_2$, $O_2$ and hydrocarbons, in the case of argon, that is to say containing a maximum level of the order of 1 ppb for each of the impurities.

At present, most known processes only make it possible to obtain partially purified inert fluids, in particular argon, that is to say containing more than 100 ppb of impurities, in particular $N_2$ and $O_2$, and usually more than 1 ppm of $O_2$ and $N_2$ impurities.

However, such levels of impurities are unacceptable in the field of electronics because these impurities can react with the materials and electronic components, such as printed circuits, and cause damage to them.

Furthermore, the problem of purifying inert fluids with respect to their hydrocarbon impurities, in particular methane ($CH_4$), has not, or has not completely, been solved to date.

However, impurities of the hydrocarbon type are found in inert fluids, in particular in argon, especially argon produced using a process combining cryogenic distillation and hot catalytic de-oxygenation in the presence of industrial hydrogen, which hydrogen often contains traces of impurities of the $CH_4$ type, at levels which may be up to 400 ppb, as has been shown by analyses carried out at the production site, that is to say, at levels which may be comparable with the level of oxygen impurities, which oxygen is considered with nitrogen to be a major pollutant of argon.

SUMMARY OF THE INVENTION

The object of the present invention is therefore to provide an effective process, preferably a PSA (pressure swing adsorption) or TSA (temperature swing adsorption) process, for obtaining an inert fluid, in particular argon, substantially free of its major impurities, namely $O_2$, $N_2$ and hydrocarbons, that is to say, containing at most about 1 ppb of the impurities, which process is simple to employ and of reasonable cost.

The invention accordingly relates to a process for purifying an inert fluid with respect to at least one of its impurities nitrogen ($N_2$), oxygen ($O_2$), carbon dioxide ($CO_2$), carbon monoxide (CO) and hydrocarbons, in which at least some of the impurities are removed using a first adsorbent of the X zeolite type having a silica to aluminum ratio less than or equal to 1.15, and a purified inert fluid containing at most 10 ppb of impurities is recovered; such a zeolite is conventionally referred to as an LSX (for low silica X) zeolite.

Depending on the particular case, the process of the invention may comprise one or more of the following characteristics:

- the X zeolite, of the faujasite type, has a silica to aluminum ratio less than or equal to 1.10, preferably of the order of 1;
- the adsorbent is an X or LSX zeolite containing at least 10% of metal cations of the same nature or of different nature, preferably at least 50%;
- the cations are selected from the group formed by the alkali metals (Li, K, etc.), the alkaline-earth metals (Ca, Sr, Mg, etc.) and the transition metals (Cu, Ag, Au, Zn, etc.) or mixtures thereof, preferably Ca or Ag cations;
- at least some of the $O_2$ impurities are removed using a second adsorbent selected from porous metal oxides and optionally exchanged clinoptilolite;
- the impurities are removed at a temperature of between −187° C. and −135° C., preferably between −186° C. and −146° C.;
- the X zeolite contains at least 70% of calcium cations, preferably from 75% to 95%;
- the X zeolite contains from 5% to 95% of calcium cations and from 95% to 5% of lithium cations, preferably from 80% to 95% of lithium cations;
- the zeolite furthermore contains potassium and/or sodium cations, preferably from 0% to 10% of potassium cations and/or from 1% to 20% of sodium cations;
- the impurities are removed at a pressure of between $10^5$ Pa and $3 \times 10^6$ pa, preferably between $10^5$ Pa and $1.7 \times 10^6$ Pa;
- the first adsorbent and second adsorbent are introduced into the same adsorber;
- a purified inert fluid containing at most approximately 1 ppb of impurities is recovered;
- the inert fluid is selected from argon, neon, krypton, xenon, helium etc.;
- it comprises a step of regenerating at least one adsorbent with an inert gas and/or a reducing gas mixture.

Thus, when the adsorber contains only a bed of LSX zeolite, it is possible to carry out regeneration of this bed using an inert gas, such as nitrogen at ambient temperature or heated to a temperature of between 100° C. and 200° C., followed by final flushing with purified argon at ambient temperature, or heated. Conversely, when the adsorber furthermore contains a bed of metal oxide particles, such as a hopcalite, it is then appropriate also to carry out regeneration of its hopcalite particles by flushing them with a reducing fluid, such as a gas mixture containing hydrogen, for example 2% hydrogen in nitrogen, followed by final flushing with argon.

However, when such flushing with a reducing gas is carried out, care should be taken to avoid or minimize contact between this reducing gas and an LSX zeolite which is exchanged with a transition metal, such as silver or copper, in order to avoid impairing its intrinsic properties, namely in particular the selectivity and the adsorption capacity of this exchanged LSX zeolite. To do this, it is preferable to introduce the reducing gas downstream of the bed of exchanged LSX zeolite, when the intention is to regenerate in countercurrent, or, conversely, to extract it before it comes into contact with the bed of LSX zeolite, when cocurrent regeneration is carried out, in particular, with the aid of a purge expediently located between the two beds, as described in U.S. Pat. No. 4,579,723.

Preferably, the present invention is applied to the purification of diphasic liquid argon or argon gas at very low temperature, for example, having a temperature about 30° C. higher than its boiling point.

The invention also relates to a plant capable of implementing the aforementioned process, comprising means for feeding the fluid to be purified and at least one adsorber containing at least one bed of particles of at least one adsorbent.

In a first embodiment, the adsorber contains at least one first bed of adsorbent of the LSX type, intended to remove at least the $CH_4$ and $N_2$ impurities, and one second bed of adsorbent of the hopcalite type, intended to remove at least some of the $O_2$ impurities.

The two beds of adsorbents of different natures can be, depending on the particular case, installed on one another while being separated solely by a grille, or alternatively spaced apart from one another by an empty space, that is to say having a given height or redistribution zone, as represented in document U.S. Pat. No. 4,579,723, when the zeolite is exchanged with a transition metal.

In a second embodiment, the adsorber contains a single bed containing a mixture of adsorbent particles of the LSX and hopcalite types.

Advantageously, a mechanical filtration means, such as a metal or ceramic filter, is placed downstream of each adsorber so as to retain the fine particles or dust produced by friction/wear of the adsorbent beads.

The process and the plant of the invention make it possible to obtain ultrapure inert fluids, in particular argon, which are substantially free of their impurities and meet the specifications of the electronics industry, that is to say, containing less than about 1 ppb of the impurities.

BRIEF DESCRIPTION OF THE DRAWINGS

The invention will now be described in greater detail with reference to the appended drawings in which.

DETAILED DESCRIPTION OF THE INVENTION

The invention will now be illustrated with the aid of examples which are given by way of illustration but without implying any limitation.

Figure 2:
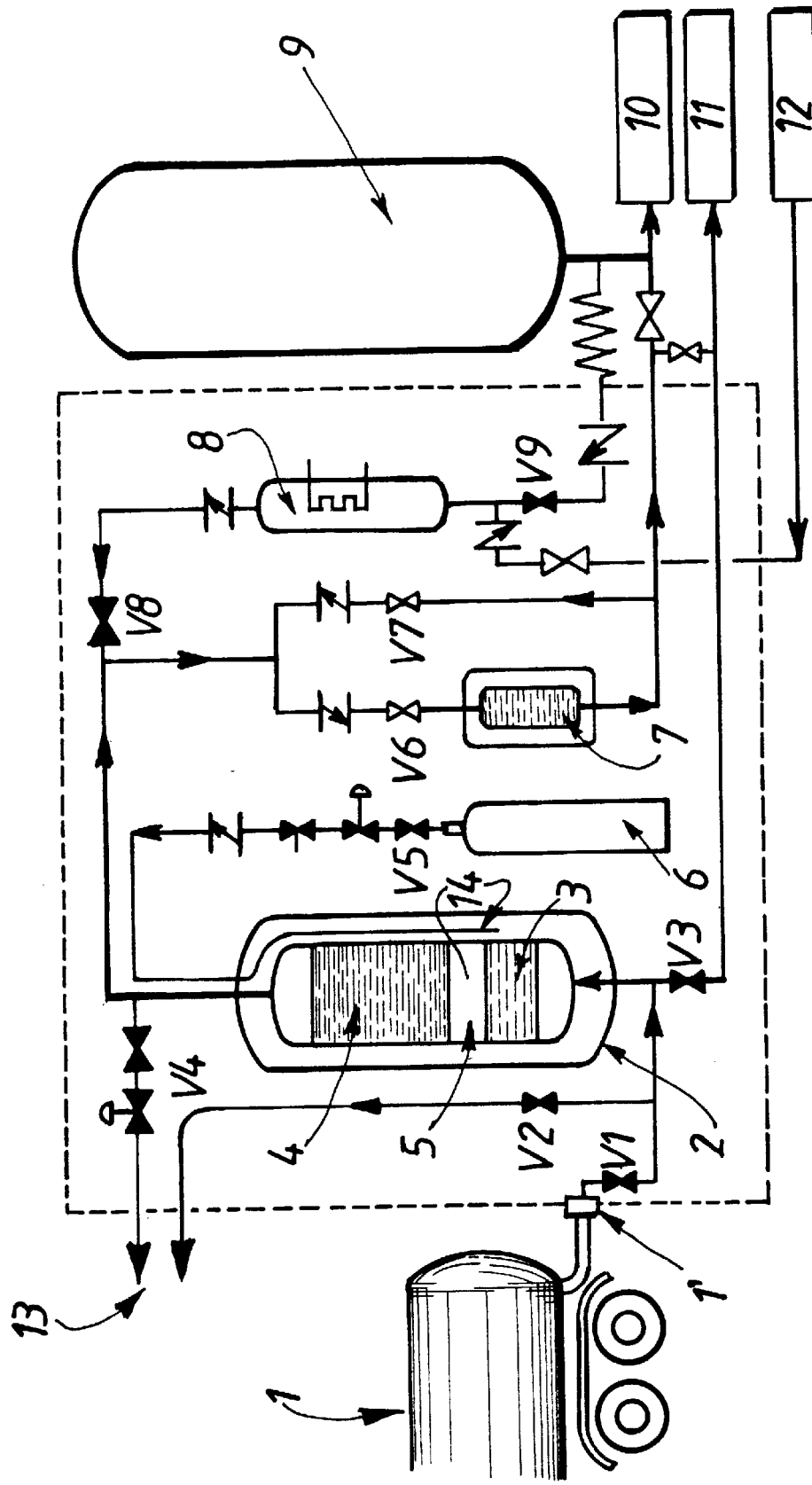
FIGS. 2 and 3 are alternative schematic representations of a device for purifying inert fluid in accordance with the present invention.

FIG. 2 represents a device for purifying inert fluid in the liquid state, such as liquid argon, capable of implementing the process according to the invention.

More precisely, FIG. 2 shows a tanker containing the inert fluid to be purified, here impure liquid argon, which tanker 1 is connected via an outlet hose 1' to a fluid purification device according to the invention; the transfer of the fluid from the hose 1' to the device is controlled by a valve V1.

The device in FIG. 2 comprises an adsorber 2 where the impure liquid argon is purified, which adsorber 2 contains a first bed 3 of porous metal oxide, such as a hopcalite, which is intended to remove at least some of the impurities of the oxygen type, and a second bed 4 of LSX zeolite which is intended to remove the impurities which are not retained by the first bed 3 of porous metal oxide; the beds 3 and 4 are separated by a redistribution zone 5, that is to say the beds 3 and 4 are placed at a given distance from one another corresponding to the redistribution zone 5.

The liquid argon purified in the adsorber 2 is then discharged, via lines and valve V6, to filtration means 7, here sintered metal, intended to remove the dust and fine particles which may result from frictional wear of the adsorbent particles located in the adsorber 2. Filtered liquid argon may be recycled to filtration means 7 via lines and valve V7.

The ultrapure liquid argon, with the dust that it may possibly contain having been removed, is then conveyed via lines to a user site 10 or, if appropriate, stored in a storage container 9.

Conventionally, before starting to unload the tanker 1, care is taken to purge the hose 1' and the line sections located between the valves V1, V2 and V3 to the atmosphere 11 and 13 via valve V4.

When the adsorbent is being regenerated, the procedure adopted is as described in the following examples, that is to say, by flushing the LSX zeolite bed 4 with an inert fluid flow at a temperature in excess of 100° C. For example, vaporized liquid argon taken from the container 9 is fed via valve V9, or liquid nitrogen or nitrogen gas taken from a storage container 12, is heated to a temperature in excess of 100° C. in a heater 8, before this inert fluid is introduced into the adsorber 2 via valve V8 in order to regenerate the LSX zeolite bed 4 therein.

Furthermore, the hopcalite bed is regenerated using a reducing fluid, such as a hydrogen and nitrogen gas mixture (with 2% hydrogen); the hydrogen is taken from a storage container 6, then introduced via valve V5 into the adsorber 2 level with the redistribution zone 5 by means of an appropriate tap 14, to then be mixed with the inert fluid eluted from the LSX zeolite charge.

When the hopcalite bed is being regenerated, contact between the reducing gas ($H_2/N_2$) and the LSX zeolite bed is avoided as far as possible.

It should be noted that the two beds 3 and 4 are regenerated in countercurrent; the purge fluid is discharged to the atmosphere via lines and purge means 11 and V3.

After the two adsorbent beds 4 and 3 have been regenerated, the adsorber 2 is returned to purification status by flushing it in countercurrent with vaporized liquid argon taken from the container 9.

Figure 3:
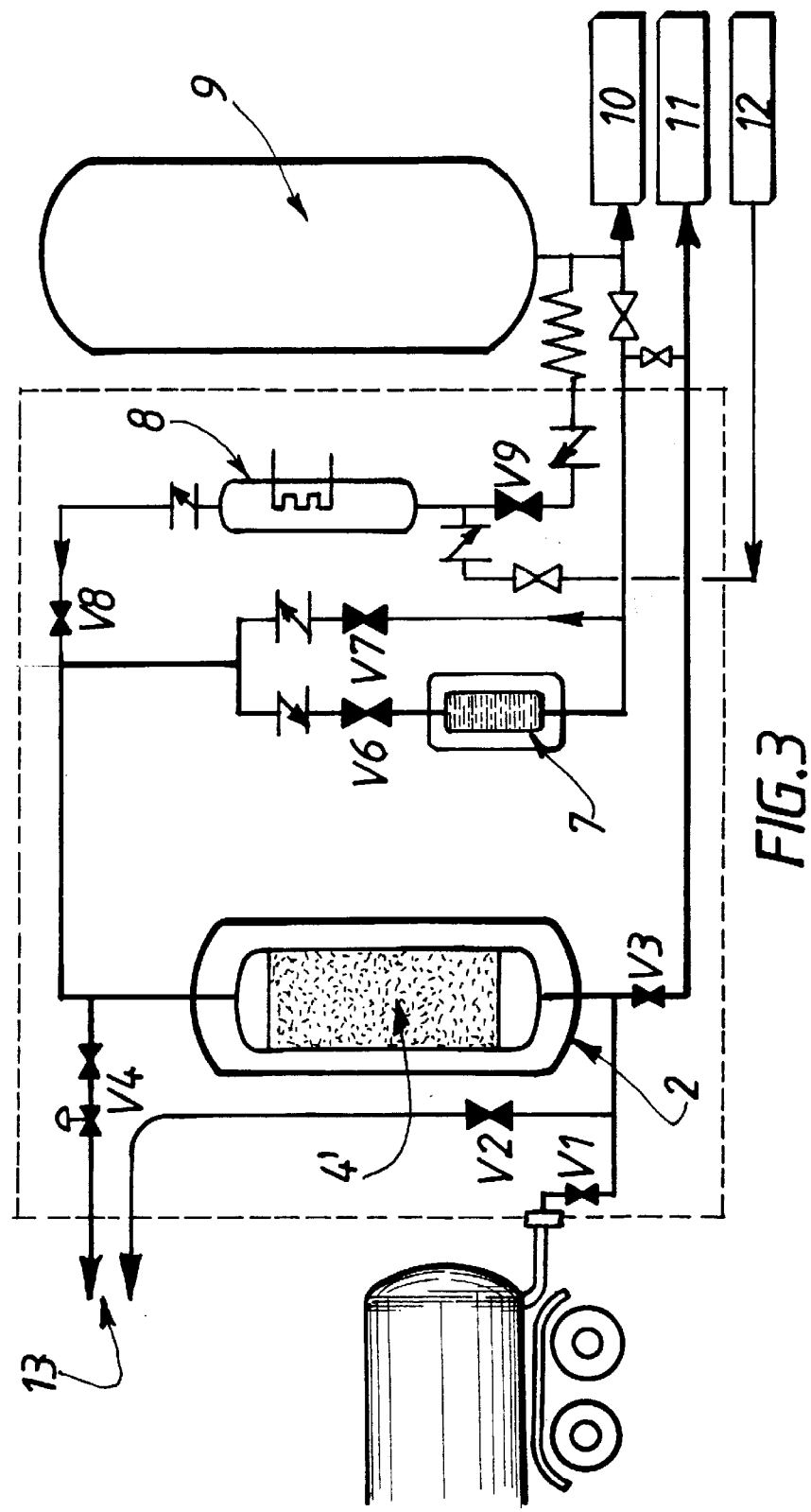

For its part, FIG. 3 represents an industrial plant substantially identical to the one in FIG. 2, apart from the fact that the plant in FIG. 3 comprises an adsorber 2 containing only a single bed 4' of LSX type zeolite.

It can furthermore be seen that the tap line 14, the distribution zone 5 and the hydrogen source 6 are no longer present in this case.

Since the other parts of the device are substantially identical to those in FIG. 2, they will not be re-explained below.

Although FIGS. 2 and 3 relate to devices for purifying argon in liquid form, similar or identical devices could be produced to purify argon or another inert fluid, such as in particular helium, in liquid, gas or diphasic form, for example.

One or more heat exchangers could thus be incorporated between the adsorber 2 and the valve V1, these heat exchangers being intended to vaporize the liquid argon and thus obtain argon gas which would subsequently be purified in the adsorber 2, in the case when the intention is to purify argon gas.

Moreover, it is also possible to have not one, but two or more adsorbers 2, operating in parallel so that while one of the adsorbers is in the production phase, that is to say, in the purification phase, the other is in the regeneration phase.

In the following examples, the analysis is carried out with an analyzer of the APIMS type (atmospheric pressure ion mass spectrometry) whose detection thresholds are as follows: about 0.05 ppb for CO, about 0.01 ppb for $CH_4$, about 0.005 ppb for $O_2$, about 0.001 ppb for $CO_2$ and about 1 ppb for $N_2$.

EXAMPLE 1

Argon gas is produced by a hybrid process combining cryogenic air distillation and a deoxo process.

Analysis of the argon gas produced in this way shows that it contains about 350 ppb of $CH_4$, 1400 ppb $N_2$ and 400 ppb $O_2$ as impurities; it is then artificially polluted with 200 ppb CO.

The impure argon gas is then subjected to purification by passing the impure argon successively through:

a first bed of LSX zeolite exchanged to 90% with calcium, having an Si/Al ratio=1 (CaLSX) and intended to retain at least the $CH_4$, $N_2$ and CO impurities;

a second bed of hopcalite for removing the $O_2$ impurities.

This purification is carried out at approximately −160° C. and at a pressure of the order of $7 \times 10^5$ Pa.

The two adsorbent beds are placed within the same adsorber or bottle.

The argon purified in this way is recovered and re-analyzed, which shows that the level in the argon of its $CH_4$, $N_2$, CO and $O_2$ impurities is at most approximately 1 ppb.

EXAMPLE 2

Example 2 is similar to Example 1, apart from the fact that it was carried out on liquid argon and that the bottle, that is to say, the adsorber, this time contains a single bed consisting of a mixture of adsorbent particles of different natures (LSX/hopcalite mixture).

In this case, the purification temperature is −163° C. and the pressure is $7 \times 10^5$ Pa.

The results obtained are identical to those in Example 1, thus demonstrating the effectiveness of the process of the invention in the purification of liquid argon or argon gas with respect to the abovementioned impurities.

EXAMPLE 3

This example is similar to Example 2, but relates to the purification of supercooled liquid krypton containing the following impurities: 500 ppb $O_2$, 200 ppb CO and 500 ppb $CH_4$.

The polluted liquid krypton is purified at a temperature of −153° C. and at a pressure of $7.10^5$ Pa, by passing the krypton through a double bed (LSX+hopcalite).

Krypton containing less than 2 ppb $O_2$, CO and $CH_4$ is recovered, that is to say, a quantity of impurities below the detection threshold of the analyzers used (analyzer of the OSK type for $O_2$ and RGA5 analyzer for CO and $CH_4$: detection thresholds<2 ppb).

EXAMPLE 4

Supercooled liquid argon is purified at a temperature of the order of −185° C. and at a pressure of $8 \times 10^5$ Pa.

The unpurified argon, that is to say, the argon before purification, contains approximately 100 ppb CO, 500 ppb $O_2$, 100 ppb $CO_2$, 500 ppb $CH_4$ and 2000 ppb $N_2$.

The purification process employs a bed of LSX zeolite exchanged to 90% with calcium cations, and a hopcalite bed, that is to say, a mixture of copper and manganese oxides; the two beds are incorporated in the same adsorber but separated by a height of about 10 cm by way of a redistribution zone, as represented in FIG. 2.

Figure 1:
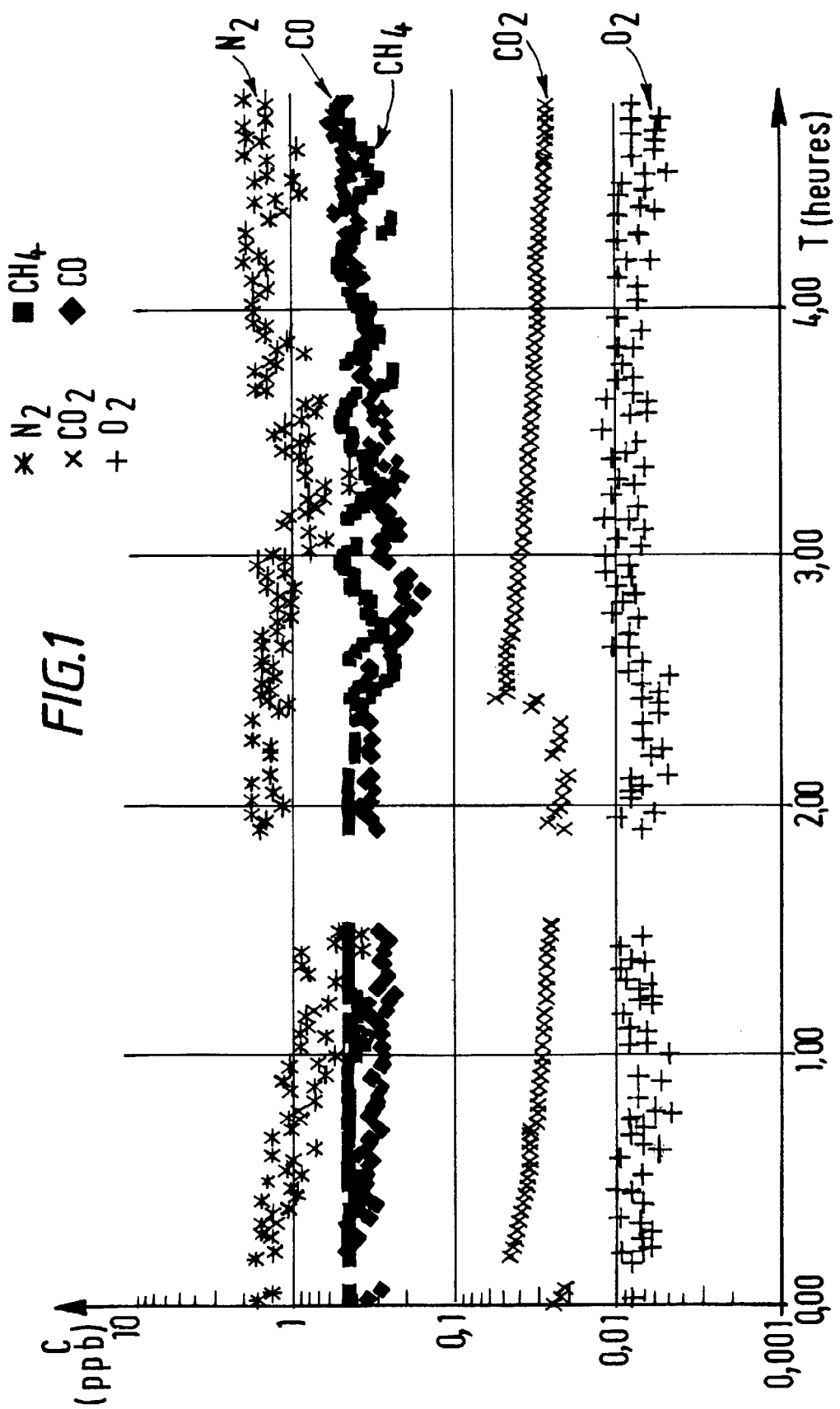
FIG. 1 is a graphical representation of the amount of impurities remaining in liquid argon having been purified in accordance with the present invention as a function of time.

The results obtained are represented in FIG. 1 which, on the ordinate, gives the level (C) of the $N_2$, $CO_2$, $O_2$, CO and $CH_4$ impurities (in ppb) contained in the liquid argon after purification and, on the abscissa, gives the duration (T) of the purification process (in hours).

It is clear to see that the process of the invention guarantees, over at least 5 consecutive hours, a level of the order of approximately 1 ppb of the impurities in the liquid argon, which is entirely compatible with the specifications of the electronics industry.

EXAMPLE 5

Tests carried out under conditions identical to those in Example 4, performed on liquid argon containing approximately 200 ppb CO, 1000 ppb $O_2$, 1000 ppb $CH_4$, 100 ppb $CO_2$ and 4000 ppb $N_2$ led, as in Example 4, to purified liquid argon containing at most approximately 1 ppb of the impurities.

EXAMPLE 6

After purification, the adsorber used in Examples 4 and 5 was subjected to regeneration at a temperature of from 200 to 250° C. and at atmospheric pressure, in the following way:

a) Flushing the adsorbent beds with an inert gas, such as nitrogen;

b) Flushing the hopcalite bed with an $H_2/N_2$ mixture (2% $H_2$) so as to reduce the metal oxide;

c) Flushing with an inert gas, such as nitrogen, to purge the residual hydrogen;

d) Flushing with previously purified argon gas to cool and recondition the adsorber.

It should be noted that, when only the LSX zeolite is employed, the bed of LSX zeolite may be regenerated at a lower temperature, for example, at ambient temperature, and at atmospheric pressure while flushing with an inert fluid and optionally final flushing and purging with argon gas.

What is claimed is:

1. Process for purifying an inert fluid with respect to at least one of its impurities nitrogen ($N_2$), oxygen ($O_2$), carbon dioxide ($CO_2$), carbon monoxide (CO), and hydrocarbons, which comprises:

removing at least some of said impurities using a first zeolite adsorbent having a silica to aluminum ratio less than or equal to 1.15; and recovering a purified inert fluid containing at most 10 ppb of said impurities.

2. The process according to claim 1, wherein the zeolite adsorbent has a silica to aluminum ratio less than or equal to 1.10.

3. The process according to claim 2, wherein the zeolite adsorbent has a silica to aluminum ratio of about 1.

4. The process according to claim 1, wherein the zeolite adsorbent is an X or LSX zeolite containing at least 10% of cations.

5. The process according to claim 4, wherein the cations are selected from the group consisting of calcium, silver, copper, strontium, barium, lithium, gold, zinc, potassium, sodium, magnesium and mixtures thereof.

6. The process according to claim 1, wherein the zeolite adsorbent is an X or LSX zeolite containing at least 50% cations.

7. The process according to claim 1, wherein the zeolite adsorbent contains at least 70% of calcium cations.

8. The process according to claim 7, wherein the zeolite adsorbent further contains from 0% to 10% of potassium cations and/or from 1% to 20% of sodium cations.

9. The process according to claim 1, wherein the zeolite adsorbent contains from 75% to 95% of calcium cations.

10. The process according to claim 1, wherein the zeolite adsorbent contains from 5% to 95% of calcium cations and from 95% to 5% of lithium cations.

11. The process according to claim 1, wherein the zeolite adsorbent contains from 5% to 95% of calcium cations and from 80% to 95% of lithium cations.

12. The process according to claim 1, wherein at least some of the oxygen impurities are removed using a second adsorbent selected from porous metal oxides and optionally exchanged clinoptilolite.

13. The process according to claim 12, wherein the first zeolite adsorbent and the second adsorbent are introduced into the same adsorber.

14. The process according to claim 1, wherein the impurities are removed at a temperature ranging between $-187°$ C. and $-135°$ C.

15. The process according to claim 1, wherein the impurities are removed at a pressure ranging between $10^5$ pa and $3 \times 10^6$ pa.

16. The process according to claim 1, wherein the purified inert fluid contains at most 1 ppb of said impurities.

17. The process according to claim 1, wherein the inert fluid is selected from the group consisting of argon, neon, krypton, xenon and helium.

18. The process according to claim 1, further comprising regenerating the first zeolite adsorbent with an inert gas and/or a reducing gas.

* * * * *